Patented Jan. 3, 1950

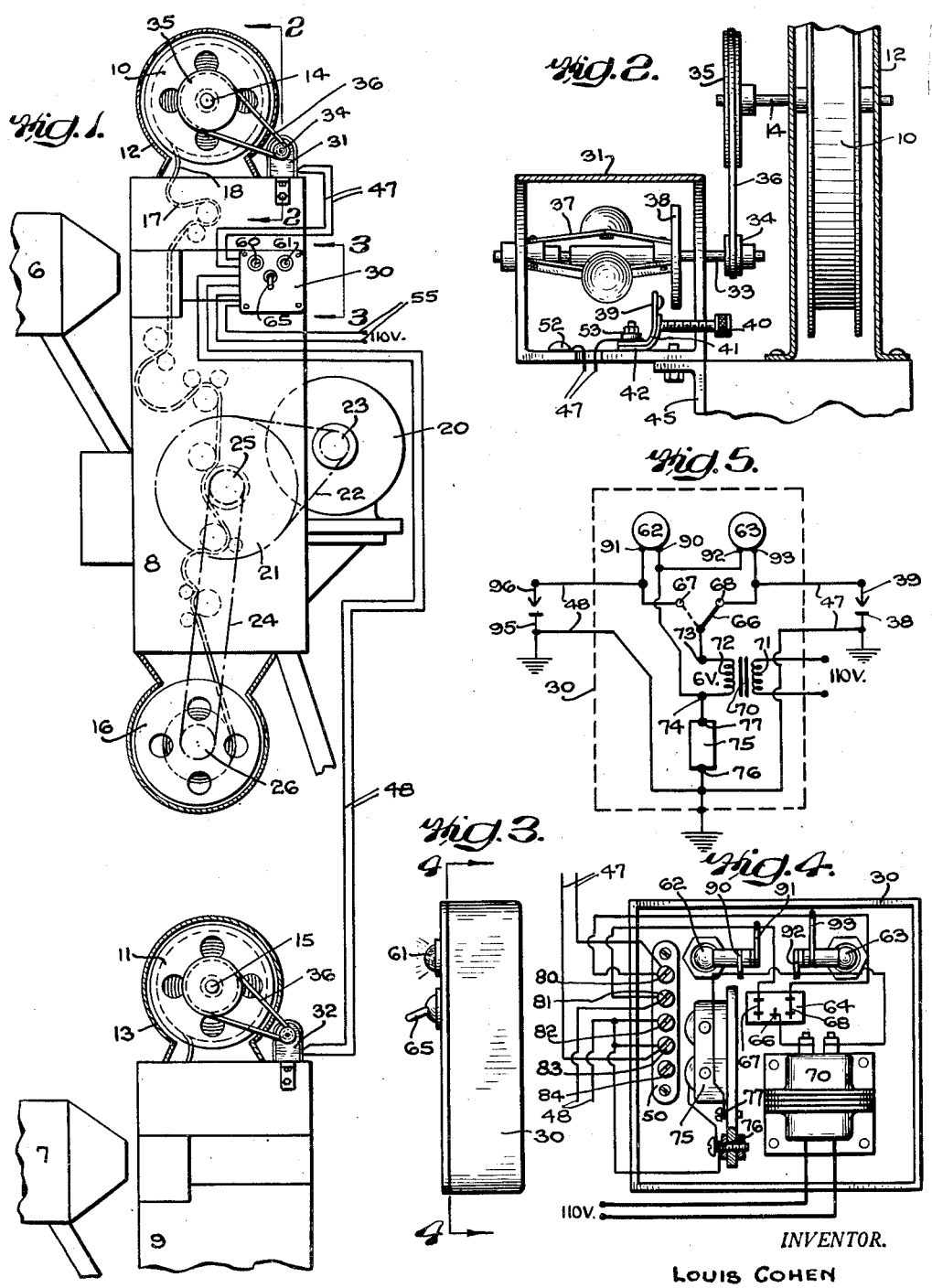

2,493,340

UNITED STATES PATENT OFFICE 2,493,340

MOTION-PICTURE REEL END SIGNAL MECHANISM

Louis Cohen and Stewart R. Rahn, Philadelphia, Pa.

Application December 2, 1947, Serial No. 789,146

2 Claims. (Cl. 177—311)

The present invention relates to motion picture projectors and the like, and more particularly to an indicator system which may readily be attached to an existing dual motion picture projector installation for visibly and audibly indicating to an operator thereof when the film supply of either projector in operation is nearing depletion.

Known control and indicator systems for transferring operation from one projector to the other in a dual motion picture projector arrangement are notably complicated and expensive, and generally involve building integrally with the projector in manufacture.

It is a primary object of the present invention, to provide an effective and simplified indicator system which may be utilized as an attachment for existing dual motion picture projector installations and the like, and which may readily be applied thereto at minimum cost.

It is also an object of this invention to provide an improved indicating attachment for motion picture projectors which may operate visibly and audibly to register a condition of operation thereof, such as the condition of the film supply, whereby for example, an operator may be warned of the approaching depletion of the film on the supply reel.

It is an object of the invention also, to provide an indicating system of the character above referred to, which is wholly electrically operated and provides both audible and visible indication of the condition of the film supply and which may be controlled for dual operation wholly by a single switching means.

It is also a further object of the invention, to provide an improved indicator attachment for motion picture projectors which comprises compact, easily installed units and which may readily be connected by simple, two-wire electrical circuits.

A further and important object of the invention is to provide an electrically operated visual and audible indicator system for a dual motion picture projector installation which may readily be connected mechanically with the film supply reel and which comprises three simple compact units, readily attachable to the projector installation, and interconnected by simple conductor circuits.

The invention will, however, be further understood from the following description, when considered in connection with the accompanying drawing, and its scope will be pointed out in the appended claims.

In the drawing,

Figure 1 is a view in elevation and partly in section, on a greatly reduced scale, of an indicator system embodying the invention as applied to a dual motion picture projector installation;

Figure 2 is a detailed sectional view, on an enlarged scale, showing a portion of the indicator system of Figure 1 taken on line 2—2 of Figure 1;

Figure 3 is a side view of a control unit for the indicator system of Figure 1, taken on line 3—3 and on a slightly enlarged scale;

Figure 4 is an interior plan view of the control unit of Figure 3, taken on line 4—4 and on the same scale, showing details of the electrical wiring thereof and interior elements in accordance with the invention; and Figure 5 is a schematic circuit diagram of the indicator system of Figure 1 in accordance with the invention.

Referring to Figures 1, 2 and 3, in which like parts are indicated by the same reference numerals, 6 and 7 represent motion picture projectors, each having the usual film control mechanisms contained in casings indicated at 8 and 9 respectively. A film supply reel 10 is provided at the top of casing 8 and a film supply reel 11 is provided on the top of casing 9, each being contained in suitable housings indicated at 12 and 13 respectively. Each of the reels 10 and 11 are provided with suitable shafts 14 and 15 respectively, on which they operate, being journalled in the respective casings, as indicated for example, in Figure 2.

Each of the projectors is provided with a film receiving reel, as indicated at 16, mounted at the bottom of the casing, as indicated in connection with casing 8. Since both projectors may be considered to be the same, the following description will apply to both. Furthermore the projectors shown are merely representative of the type of equipment to which the invention may be most readily applied and with which it has its present greatest usefulness.

The film path through the projectors, from the supply reels to the receiving reels, is indicated by the dotted trace 17 of the film 18 from the supply reel 10 to the receiving reel 16, and is similar to the trace of the film 19 from the reel 11 to a corresponding receiving reel (not shown). As in the usual installation, the receiving reel 16 is driven by a suitable motor 20 connected therewith by an idler pulley indicated at 21 having a belt connection 22 with the motor pulley 23, and a second belt drive connection 24 between a pulley 25 on the idler and a pulley 26 on the receiving reel.

In operation, as the receiving reel 16 is driven by the motor 20, the feed mechanism in casing 8 operates to maintain the speed of the film at substantially constant speed in order to maintain a uniform rate of speed for the picture frames through the projector. Therefore, as the film is drawn off the supply reel 10, the speed of rotation of the reel is increased, reaching a predetermined speed as the end of the film is approached.

In the operation of motion picture projectors in dual installations for which the present invention is adapted, as in theatres, for example, the conventional practice is to employ two projectors alternately, one projector showing one reel and the other being synchronized to start a succeeding reel when the first ends. Thus while one projector is in operation, the other is made ready for use. It is important that the operator know when the film on the reel of one projector is approaching the end so that the other may be readied for use to project a succeeding reel without interruption.

In small theatres and in private installations, for the projection of motion pictures through the medium of successive reels, the cost of available automatic equipment for the control of two projectors is prohibitive. It is desirable, therefore, that simple and effective means be made available to such installations which may readily be applied to the installation at low cost and which may easily be installed by available personnel at such installations.

In accordance with the invention, therefore, there may be provided, in connection with the dual projector arrangement above described, a simple and effective film indicator system comprising only three small, enclosed units, namely, a control box or unit 30 mounted on the frame or casing of one of the projectors, as shown on the side of the casing 8, and two small speed-responsive electrical switch or contact devices or units 31 and 32, mounted on the projector frames or casings, preferably adjacent the supply reels, in a position to be mechanically connected therewith by belt or other suitable driving means.

In the present example, representing a preferred installation, the unit 31 is mounted on top of the casing 8 adjacent to the supply reel 10, while the unit 32 is mounted in a similar position on the casing 9 of the second projector. Referring more particularly to Figure 2, each of these units provides a housing for a small fly-ball governor or speed responsive element 37, having a drive shaft 33 projecting from the housing and provided with a driven pulley 34. The shaft 14 of the supply reel 10 may then be provided with a drive pulley 35 on the outer end thereof which is connected with the pulley 34 by a simple belt 36, so that as the reel is rotated in operation, the shaft 33 of the speed responsive device is driven thereby.

Upon increase in the rotative speed of the supply reel during withdrawal of the film therefrom, the fly-balls of the governor element 37 operate to cause an axially movable end plate or disc contact element 38 to move to left as viewed in the drawing, approaching an adjustable electrical contact element 39, the position of which with respect to the disc may be controlled by a thumb screw 40 extending through the housing of the unit 31.

As shown, the contact element 39 is provided on the end of a flexible spring contact strip 41 which is secured to the interior of the housing and insulated therefrom by a strip of insulating material indicated at 42. The contact 39 is adjusted by the thumb screw 40 so that the disc contact element 38 engages therewith when the speed of the film supply reel 10 reaches a value which is indicative of the approaching end of the film. The speed responsive unit 32 is a duplicate of the speed responsive unit 31 and is similarly connected with the supply reel 11 of the projector 7—9.

With further reference to Figures 1 and 2, it will be noted that the speed responsive units are adapted to be mounted on the projector casings by bracket means 45 and that the installation on any existing projector installation is comparatively simple, involving only the addition of a pulley to the end of the supply reel shaft and a simple belt drive connection therewith. The equipment further involves only the mounting of the control box 30 on one of the projectors, such as the casing 8 of the first projector as shown, and two simple circuit connections, which will next be described.

It will be noted that the speed responsive unit 31 is connected to the control box 30 through a pair of control leads 47 and that the speed responsive unit 32 is similarly connected with the control box 30 through a pair of control leads 48. These leads may be simple twisted-pair connections adapted for easy installation, and extend between a terminal board 50 within the control box 30 as shown in Figure 4, and the speed responsive units. The connection within each unit is as shown in Figure 2, where one of the leads 47 is connected to the housing 31 and thence to the frame and ground, as indicated at 52, while the other lead is connected to the flexible spring contact strip 41 and thence to the contact 39, as indicated at 53. The only remaining connection for the system is a connection provided by supply leads indicated at 55, these being connected with any suitable outlet (not shown) in the usual manner, such as the usual 110 volt, alternating current house supply.

Referring now to Figures 4 and 5 along with the preceding figures, the same reference numerals are used throughout to indicate like parts and circuit elements. It will be seen that the control box is provided with two jewel indicators or colored translucent windows 60 and 61 on the front face or cover thereof, behind which are located indicator lamps, 62 and 63 respectively, within the control box, together with a single-pole, double-throw or two-point selector switch 64 having a control lever 65 on the face of the cover for the unit.

As shown more clearly in Figure 5, the switch comprises a movable contact 66 and two fixed contacts 67 and 68, the switch being shown in a position wherein the movable arm or contact 66 is connected with the contact 68, the alternative connection with the contact 67 being shown in dotted lines. The control unit further contains a small step-down transformer 70 having a primary 71 to which the supply leads 55 are connected, and a secondary 72 having terminals 73 and 74 providing a low voltage output, such as 6 volts, for example. Mounted adjacent to the transformer, in the casing, is an electrical audible signal or sound producing device such as a buzzer 75 having input terminals 76 and 77.

For readily effecting the various connections, particularly the connections for the extended control leads, the terminal board 50 is provided with terminals 80, 81, 82, 83 and 84, the last being a spare. The control leads 47 from the speed responsive unit 31 of the first projector are connected to terminals 80 and 83 while the control leads 48 from the speed responsive unit 32 of the second projector are connected to terminals 81 and 82. The remaining circuit connections for the control unit 30 are all within the housing provided thereby, although schematically shown in Figure 4 in extension thereof for the sake of clarity.

The circuit connections within the unit 30 may better be traced between the socket terminals 90 and 91 for the lamp 62 and the socket-terminals 92 and 93 for the lamp 63 as shown more clearly in Figure 5, which is the same schematically but omitting the representation of the terminal board 50 and the terminals thereof for the sake of clarity.

Referring to Figure 5, the terminals 90 and 92 of lamps 62 and 63, respectively, are connected to the terminals 74 of the secondary, together with terminals 77 of the buzzer 75, being thereby all connected in common with the terminal 74. The terminal 73 of the secondary 72 of the transformer is connected with the contact arm 66 of the switch, which in the position shown, is connected with the terminal 68.

The switch terminal 68 is connected with the terminal 93 of the lamp 63, and with the contact 39 of the speed responsive device 31 through one of the control leads 47, the other control lead being connected to the casing of the unit 31 and thence to the movable disc 38, since the structure of the unit and parts are metallic and conducting, as is the usual case with mechanical elements of the type shown. The contact element 38 is shown grounded in the diagram for that reason, and is also connected, as indicated, to the terminal 76 of the buzzer.

Likewise, the movable disc terminal of the other speed responsive unit 32, is connected through one of the control leads 48 with the same terminal 76 of the buzzer. The disc terminal, in the diagram Figure 5, is referred to by the numeral 95. The adjustable contact in the unit 32 is indicated by the numeral 96 and is connected through the remaining one of the control leads 48 jointly with the terminal 91 for the lamp 62 and contact 67 of the contact switch. A similar connection is provided for the contact 39 of the speed responsive unit 31 through the remaining one of the control leads 47, jointly with the terminal 93 of the lamp 63 and terminal 68 of the control switch.

With this arrangement it will be seen that one secondary terminal, 74, of the transformer is connected jointly with the buzzer and the two indicator lamps, while the other terminal, 73, is connected through the control switch either with the lamp 63 and the control contact 39 of the speed responsive device 31, or with the lamp 62 and control contact 96 of the speed responsive device 32, jointly in pairs, whereby one lamp and one contact are energized simultaneously, to the exclusion of the other lamp and contact, selectively. Thus, by a single control switch of the simple two-point or single-pole, double-throw type, the entire control of the two speed responsive units and the indicator lamps and buzzer may be provided. Furthermore, the control circuits 47 and 48 may comprise single leads if a ground return is provided between the ground terminal 76 of the buzzer 75 and each of the contact elements 38 and 95 as indicated in Figure 5.

The operation is as follows:

With the motion picture projector 6—8 in operation and the projector 7—9 standing by for operation on termination of the film on the supply reel 10, the operator will throw the selector switch handle 65 to provide the connection shown in the circuit of Figure 5, whereby the lamp 63 is energized, together with the control contact 39 of the speed control unit 31 for the machine then in operation. Effective operation of the contacts of the other speed control unit 32 and operation of the lamp 62 is thereby prevented. With the supply leads 55 energized, the lamp 63 will be lighted and will cause the jewel light indicator 61 to glow, thereby indicating that projector 6—8 is in operation.

As the speed of the supply reel 10 increases to the point where the end of the reel is imminent, the movable disc contact element 38 under control of the governor element 37, will reach the adjusted position of the contact 39 corresponding thereto, thereby closing the circuit through the leads 47 and energizing the buzzer 75 and providing an audible indication for the operator, indicating that the second projector 7—9 should be readied for immediate operation.

When the end of the reel is reached and the second projector is placed in operation, the selector switch lever 65 is then thrown to cause the movable contact 66 to assume the dotted position shown in Figure 5, closing the circuit to the contact 67 thereby energizing the indicator lamp 62 and the contact 96 of the speed responsive unit 32 for the second projector. The jewel light 60 will then glow, indicating that the second projector is in operation.

When the film supply of the reel 11 reaches a predetermined low point, the speed responsive device 32, operating in the same manner as described for the device 31, will close the circuit through the leads 48 at contacts 95—96, thereby again energizing the buzzer 75 and warning the operator of the end of the reel 11, whereby the first projector may be readied for operation at the end thereof.

From the foregoing description, it will be seen that a simple and effective system is provided for indicating the termination of the film supply for both projectors of a dual installation, which is readily adapted for addition to any existing installations at low cost, and which is effective and simple in operation, involving merely the operation of a single switch. Furthermore, the system involves three wholly enclosed units adapted to be mounted on the exterior of existing projectors and interconnected by two simple twisted-pair conductors, and operating from supply leads which may be connected with any suitable current supply outlet.

What is claimed as new and useful is:

1. An indicator system for a motion picture projector installation having a pair of alternately operable film supply reels, comprising in combination: a signal housing containing a source of electric current, an electric audible signal connected to one side of the source, a two-position selector switch connected to the other side of said source, and a pair of electric signal lamps each having one terminal connected to the said one side of said source, the selector switch being movable to either position to connect selectively to the remaining terminals of the lamps to energize a selected lamp; a switch housing mounted on each projector, a speed responsive switch mounted in each switch housing and connected to its associated reel to close the switch at a predetermined reel speed corresponding to a near depleted condition of the film supply; and connectors connecting one side of each switch to its associated lamp and the other side of each switch to the other side of said audible signal.

2. An indicator system for a motion picture projector installation having a pair of alternately operable film supply reels comprising in combination: a source of electric current, an electric audible signal connected to one side of the source, a two position selector switch connected to the other side of said source, a pair of electric signal lamps having one terminal of each connected to the said one side of said source, the selector switch being movable to either position to connect selectively to the remaining terminals of the lamp to energize a selected lamp, a pair of speed responsive switches connected one to each reel to close at a predetermined reel speed corresponding to a near depleted condition of the film supply, and connectors connecting one side of each switch to its associated lamp and the other side of each switch to the other side of said audible signal.

LOUIS COHEN.
STEWART R. RAHN.

REFERENCES CITED

The following references are of record in the file of this patent:

UNITED STATES PATENTS

| Number | Name | Date |
|---|---|---|
| 1,502,434 | Lick | July 22, 1924 |
| 1,953,819 | Payne | Apr. 3, 1934 |
| 1,988,841 | Hayward et al. | Jan. 22, 1935 |
| 2,016,506 | Maluss | Oct. 8, 1935 |
| 2,123,084 | Tanson | July 5, 1938 |
| 2,248,351 | Hughes et al. | July 8, 1941 |
| 2,407,361 | Wilson | Sept. 10, 1946 |